(12) United States Patent
Hassani et al.

(10) Patent No.: US 11,425,493 B2
(45) Date of Patent: Aug. 23, 2022

(54) TARGETED BEAMFORMING COMMUNICATION FOR REMOTE VEHICLE OPERATORS AND USERS

(71) Applicant: Ford Global Technologies, LLC, Dearborn, MI (US)

(72) Inventors: Ali Hassani, Ann Arbor, MI (US); Erick Michael Lavoie, Van Buren Charter Township, MI (US); John Robert Van Wiemeersch, Novi, MI (US); Thomas Joseph Hermann, Troy, MI (US); Michael Hrecznyj, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/132,941

(22) Filed: Dec. 23, 2020

(65) Prior Publication Data
US 2022/0201389 A1 Jun. 23, 2022

(51) Int. Cl.
| | |
|---|---|
| *H04R 1/40* | (2006.01) |
| *H04R 3/12* | (2006.01) |
| *H04R 1/32* | (2006.01) |
| *H04B 11/00* | (2006.01) |
| *G10L 21/0216* | (2013.01) |
| *B60W 30/06* | (2006.01) |

(52) U.S. Cl.
CPC .......... *H04R 1/403* (2013.01); *G10L 21/0216* (2013.01); *H04B 11/00* (2013.01); *H04R 1/323* (2013.01); *H04R 3/12* (2013.01); *B60W 30/06* (2013.01); *G10L 2021/02166* (2013.01)

(58) Field of Classification Search
CPC .......... H04R 1/403; H04R 1/323; H04R 3/12; H04R 1/32; G10L 21/0216; G10L 2021/02166
USPC ................................. 381/86, 92, 77–82, 302
See application file for complete search history.

(56) References Cited

U.S. PATENT DOCUMENTS

| | | | |
|---|---|---|---|
| 7,106,180 B1 * | 9/2006 | Pompei .................... | G08B 3/10 381/387 |
| 7,424,118 B2 * | 9/2008 | Mori ........................ | H04R 3/12 381/104 |
| 9,241,123 B2 * | 1/2016 | Yagihashi ................ | H04N 5/60 |

(Continued)

FOREIGN PATENT DOCUMENTS

CN 107776483 A 3/2018

*Primary Examiner* — Disler Paul
(74) *Attorney, Agent, or Firm* — Frank Lollo; Eversheds Sutherland (US) LLP

(57) ABSTRACT

A remote-assist system programmed for vehicle parking assist or other remote vehicle operation features includes a selective ultrasonic beamforming Amplitude Modulated (AM) system configured and/or programmed to transmit audible alerts to a primary user via ultrasonic beamforming AM. The system localizes a mobile device that is being used by the primary user to initiate the system. The system localizes the primary user, and others in the vicinity, and determines others that may be associated with the vehicle and primary user. The system defines and reshapes a target zone to include only those associated with the primary user and the vehicle. The system electronically or mechanically steers a transducer array to steer an ultrasonic beam with an AM audio alert to the target zone, where the message is audible only to those within the target zone.

19 Claims, 9 Drawing Sheets

(56) References Cited

U.S. PATENT DOCUMENTS

| | | | |
|---|---|---|---|
| 9,783,106 B2 | 10/2017 | Vegt et al. | |
| 9,878,664 B2 | 1/2018 | Kentley-Klay et al. | |
| 9,884,583 B2 | 2/2018 | Trinh | |
| 9,928,734 B2 | 3/2018 | Newman | |
| 10,000,152 B1 | 6/2018 | Scalea et al. | |
| 10,134,416 B2 * | 11/2018 | Florencio | G10K 11/002 |
| 2004/0264707 A1 * | 12/2004 | Yang | G10K 11/26 |
| | | | 381/77 |
| 2015/0268665 A1 | 9/2015 | Ludwick et al. | |
| 2015/0382129 A1 * | 12/2015 | Florencio | H04R 5/04 |
| | | | 381/303 |

* cited by examiner

TARGETED BEAMFORMING COMMUNICATION FOR REMOTE VEHICLE OPERATORS AND USERS

TECHNICAL FIELD

The present disclosure relates to vehicle alert systems, and more particularly, to directional vehicle alert systems for remote communication.

BACKGROUND

Some remote vehicle operation systems allow a user located outside of the vehicle to provide continuous feedback to vehicle control systems using a remote vehicle control interface. Remote Parking Assist (RePA) and remote trailer backup assist are among such systems. Remote vehicle operation systems allow a primary operator to connect with vehicle control systems remotely, while the user is within several meters of the vehicle, using a connected device to perform aspects of the remote maneuver. Throughout the remote operation, the vehicle determines environmental factors such as its proximity to obstacles, and provides feedback to the user through the connected device. Some systems present the feedback to the device only when the maneuver is paused, to allow the user to focus visual attention on the task at hand. While this practice aids in focusing operator attention on the task at hand, some useful information may not be delivered to the user in an attempt to avoid visual distraction, which can be limiting and fail to provide the user with useful feedback.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
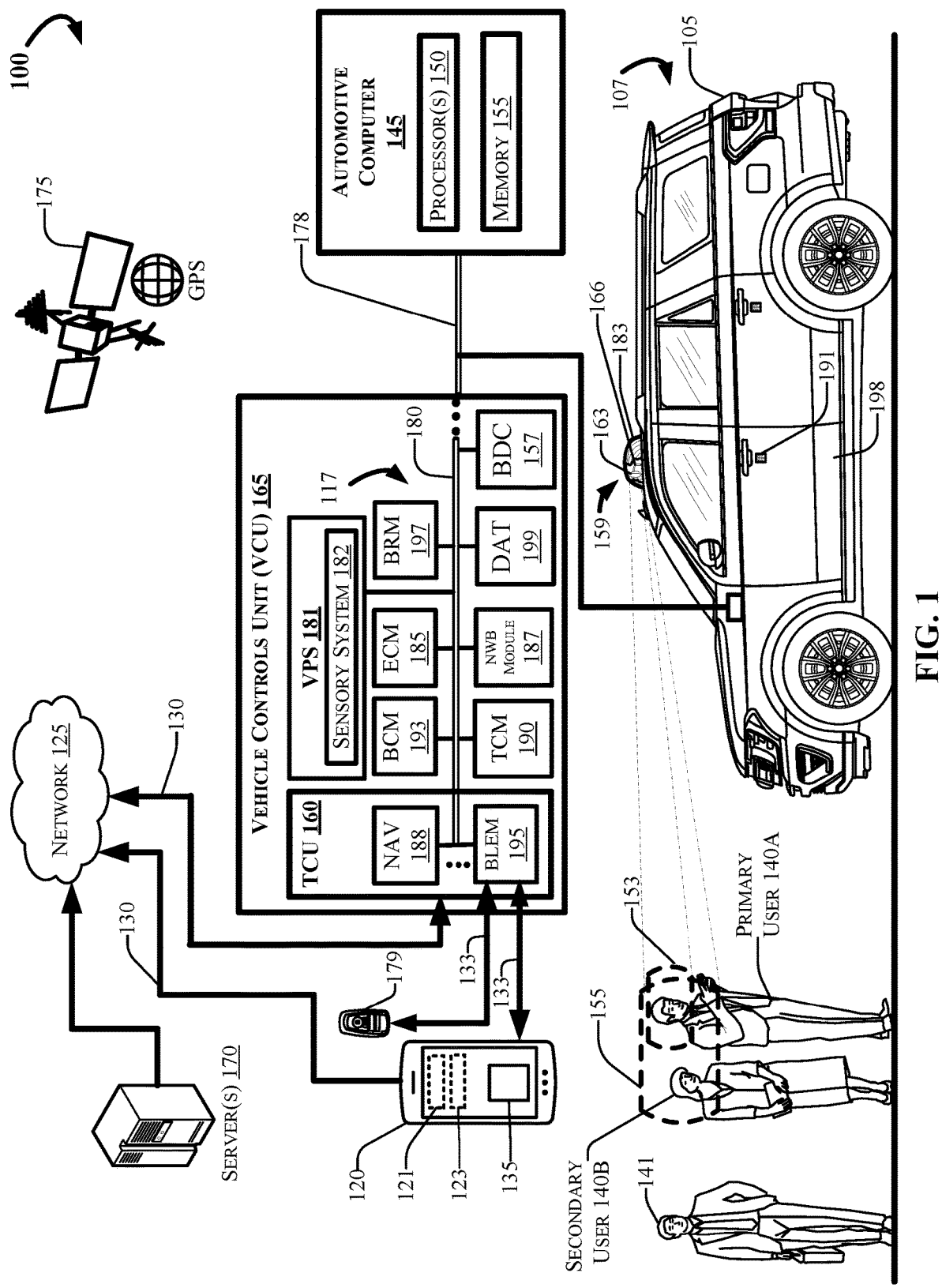
FIG. 1 depicts an example computing environment that includes a selective Ultrasonic beamforming Amplitude Modulated (AM) system in accordance with the present disclosure.

Embodiments of the present disclosure describe a selective Ultrasonic beamforming Amplitude Modulated (AM) system configured and/or programmed to transmit audible alerts to a primary user via AM information on an ultrasonic beamforming carrier. For example, the ultrasonic carrier may be in the 48 kHz to 90 Khz range of the ultrasonic spectrum and the AM information may be in the 100 Hz to 5 kHz range of the audible spectrum. Audible or "acoustic" sound waves range from about 20 Hz-20 kHz, which is generally considered the young human hearing range. The ultrasonic sound spectrum generally starts at about 20 kHz, and can be audible to other mammals but not human. The selective ultrasonic beamforming AM system may be configured to operate with and/or be part of a vehicle remote-assist system operable to provide remote parking assist, trailer backup assist, or other remote-control features for the vehicle.

To initiate the selective beamforming process, the selective ultrasonic beamforming AM system may localize a primary user using various techniques that can include localization using a mobile device operated by the primary user, as well as a vehicle sensory system that includes radar, LIDAR, cameras, and/or other sensory hardware. The selective ultrasonic beamforming AM system may localize the primary user, and determine whether any others that may be associated with the vehicle and primary user are proximate to the primary user. Any localized persons in the operating zone are evaluated to determine who may be associated with the primary operator, and who may be unrelated, but just in the general area.

The system may define a target zone to include only the head portion of the primary user, such that a vehicle-originated message may be delivered to only the primary user and not to others in the area. The ultrasonic beamforming AM system may reshape the target zone to include only the primary user's head, and only the heads of others nearby the primary user that may be associated with the primary user and the vehicle. Either electronically or mechanically, the selective ultrasonic beamforming AM system may steer a transducer array according to the reshaped target zone, and beam an audio alert on the ultrasonic carrier wave to the target zone such that the audio message is audible only to the primary user and those deemed to be associated with the primary user and/or the vehicle.

The controller can direct a transducer array to beam an audio alert to the target zone, where the AM audio message delivered on the ultrasonic carrier is audible only to those within the target zone. In one aspect, the transducer array may be disposed on a vertically and horizontally articulable aiming mechanism such that the selective ultrasonic beamforming AM system mechanically steers the array. In another aspect, the transducer array may be stationary at one or multiple points on exterior surfaces of the vehicle such that the selective ultrasonic beamforming AM system may electronically steer the array such that only the primary user and related individuals may hear the AM audio messages delivered on the ultrasonic carrier.

The ultrasonic beamforming AM system may reshape the target zone to include the heads of intended recipients, yet exclude others, even when the heads of the message recipient(s) in the target zone are at different heights. In other aspects, the primary user can remain focused on the task at hand, and still receive vehicle-delivered information without visual interruption. Embodiments of the present disclosure may provide vehicle-delivered information to a remote-control vehicle operator in a fashion that is both clear and discrete, such that other individuals nearby, who may be unassociated with the primary user or the vehicle, remain undisturbed because they will not hear the AM audio message delivered by the ultrasonic beamformed carrier.

These and other advantages of the present disclosure are provided in greater detail herein.

ILLUSTRATIVE EMBODIMENTS

The disclosure will be described more fully hereinafter with reference to the accompanying drawings, in which example embodiments of the disclosure are shown, and not intended to be limiting.

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained.

Park-assist systems, such as remote park-assist systems, may autonomously or semi-autonomously control vehicle motive functions to park the vehicle. In some aspects, remote park-assist systems may emit alerts to the user, for example, to provide a status update as remote park-assist is executed, or to alert the user as to an obstruction or hazard that may affect the park-assist maneuver. Some remote park-assist systems may emit the alert via an audible message to the user, for example, via a horn of the vehicle. In such instances, others nearby the vehicle may hear the horn and potentially become annoyed and/or confused by the audio alerts. Remote park-assist systems may also emit a visual alert to the user, for example, on a display of a mobile device of the user, or by flashing headlamps or other vehicle lights. In such instances, the user viewing the visual alert may potentially take their attention away from the maneuvering task of monitoring the vehicle as the remote maneuver-assist is being performed.

As used herein, "remote maneuver-assist" refers to a vehicle system that controls some vehicle motive functions, while the user is positioned at a remote location relative to the vehicle. Some remote maneuver-assist systems may control the vehicle motive functions without direct steering or velocity input from a user to autonomously maneuver the vehicle. Further, some example remote maneuver-assist systems can enable a user to control motive functions of the vehicle while positioned at a remote location that is outside of the vehicle cabin but nearby with respect to the vehicle.

As used herein, "remote parking," "vehicle remote park-assist," "remote park-assist," and "RePA" refer to a system in which a vehicle controls its motive functions, without direct steering or velocity input from a user (e.g., a driver), to autonomously park the vehicle within a parking spot while the user is located outside of the vehicle. "Remote trailer maneuver-assist" refers to a trailer maneuver-assist system that enables a user to control motive functions of a vehicle towing a trailer while positioned at a remote location (e.g., via a mobile device) relative to the vehicle. For example, a remote park-assist system may include and/or connect with an autonomy unit programmed to control motive functions of the vehicle responsive to receiving a remote initiation signal from a mobile device of the user.

Embodiments of the present disclosure include a selective ultrasonic beamforming AM system that is configured and/or programmed to identify and localize a user that is controlling the vehicle remotely via a mobile or other passive device, and transmitting audible messages to the user and others nearby (through selective ultrasonic beamforming) that are determined to be associated with the vehicle and/or user. Before describing embodiments in greater detail, a brief introduction to ultrasonic beamforming AM communication is provided in the following paragraphs.

A directional audible sound can be generated by amplitude-modulating audio in the human hearing range on top of an ultrasound carrier, then transmitting it from an array of ultrasonic transducers. When two sinusoidal beams are radiated from an intense ultrasound source, a spectral component is generated along the beams due to nonlinear interaction of two primary acoustic waves. At the same time, spectral components such as a sum-frequency component and harmonics are generated. However, only the difference-frequency component can travel an appreciable distance because sound absorption is generally increased with frequency, and amplitudes of higher-frequency components decay greatly compared with the difference frequency. The secondary source column of the difference frequency (often referred to as a secondary beam) is created in the primary beam, and is distributed along a narrow beam. Consequently, the directivity of the difference-frequency wave becomes very narrow, resulting in an audible sound that may be heard within a limited area. This generation model of the difference frequency is referred to as a parametric acoustic array (PAA).

When employing PAA for directional sound, which is amplitude-modulated by audio signals, the primary wave usually around 40 kHz, which is well beyond the human hearing range of 15 kHz to 20 Khz for old to young drivers. Thus, an amplitude-modulated ultrasound wave has carrier, upper and lower side-band components, resulting in reproduction of the audible sound in air due to the nonlinear interaction of the carrier and each sideband in the ultrasound beams. The directivity of the reproduced audible sound is distinct, owing to the characteristic of the parametric array, which may be, for example, an array of ultrasonic transducers configured in various topographical arrangements based on the application, carrier wave transmission distance, width and height of the target zone, and other environmental factors. It is generally understood in the art of AM ultrasonic beamforming that sound pressure level and harmonic distortion of a demodulated signal are proportional to a modulation index used in amplitude modulation. There are various known types of modulation techniques that can reduce distortion introduced by the self-demodulation process, as well as steer the beamformed audio signal using mechanical or electronic techniques for changing the shape of the beamformed payload, changing a location of the focal point, and increasing or decreasing the amplitude of the audible sound.

It can be advantageous, therefore, to provide a system and method for remote audio communication from a transducer source disposed on a vehicle, to a remote user (referred to herein as a primary user) operating a vehicle via remote maneuver-assist. As discussed herein, such communication techniques are described as a form of selective ultrasonic beamforming amplitude modulated (AM) communication.

FIG. 1 depicts an example computing environment 100 that can include a vehicle 105. The vehicle 105 may include an automotive computer 145, and a Vehicle Controls Unit (VCU) 165 that typically includes a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The user 140 may be a primary user 140A, who may control the vehicle 105 remotely according to embodiments. A secondary user 140B may be associated with the vehicle 105 and/or the primary user 140A.

The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), Ultrasonic Sound, and other possible data connection and sharing techniques.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a performance vehicle, a truck, a crossover vehicle, a van, a minivan, a taxi, a bus, etc., and may be configured and/or programmed to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 and greater autonomous features, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, a Selective ultrasonic beamforming AM system (hereafter, the "selective ultrasonic beamforming AM system 107") may be configured and/or programmed to operate with a vehicle having a Level-2 through Level-4 autonomous vehicle controller. Accordingly, the selective ultrasonic beamforming AM system 107 may provide some aspects of human control to the vehicle 105, when the vehicle is configured as an AV.

The mobile device 120 generally includes a memory 123 for storing program instructions associated with an application 135 that, when executed by a mobile device processor 121, performs aspects of the disclosed embodiments. The application (or "app") 135 may be part of the selective ultrasonic beamforming AM system 107, or may provide information to the selective ultrasonic beamforming AM system 107 and/or receive information from the selective ultrasonic beamforming AM system 107. For example, in one embodiment, the selective ultrasonic beamforming AM system 107 may transmit vehicle messages to the primary user 140A and possibly others, such as a secondary user 140B, by generating an audio notification stack (not shown in FIG. 1), and dispatching an audio payload that may include the audio notification to the primary user 140A, and if associated with the vehicle 105, the secondary user 140B. The location of the primary user 140A is depicted in FIG. 1 as a target zone 153.

In some embodiments, the primary user 140A may utilize one or more application(s) 135 to perform remote vehicle operations. The selective ultrasonic beamforming AM system 107 may localize the primary user 140A during the remote control maneuver by tracking the mobile device 120 using standard wireless localization protocols, or using other vehicle sensory system devices. Examples of standard wireless localization protocols can include, for example, Bluetooth® low energy (BLE), WiFi, LTE Direct, Ultra-Wideband (UWB), or other radio frequency (RF), as well as sound or light-based communication technology which is becoming common in commercially available mobile devices. These may include received signal strength, time of flight, angle of arrival, and other known methods.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120 and/or the fob 179. The wireless connection(s) 133 may include various low-energy protocols including, for example, Bluetooth®, BLE, Ultra Wide-Band (UWB) or other protocols such as Near Field Communication (NFC).

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Data Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the selective ultrasonic beamforming AM system 107, in accordance with the disclosure. The automotive computer 145 may include one or more processor(s) 150 and a computer-readable memory 155.

The one or more processor(s) 150 may be disposed in communication with one or more memory devices connected with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a selective AM beamforming program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and a NWB module 187, a Driver Assistance Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the selective ultrasonic beamforming AM system 107.

The VPS 181 may include one or more proximity sensors configured and/or programmed to detect the presence, proximity, and/or location of object(s) near the vehicle 105. For example, the proximity sensors may include radar sensor(s), LIDAR sensor(s), ultrasonic sensor(s), cameras, and/or any other sensor configured to detect the presence, proximity, and/or location of nearby object(s), such as obstacles, vehicles, and people and/or animals. A radar sensor detects and locates an object via radio waves, a LIDAR sensor detects and locates the object via lasers, and an ultrasonic sensor detects and locates the object via ultrasound waves. The VPS 181 may further include one or more camera(s) (not shown in FIG. 1) that may be configured and/or programmed to capture image(s) and/or video of a surrounding area of the vehicle 105 to enable nearby object(s) to be identified and located. Digital processing units can analyze the content of a camera image to detect motion and the presence of people. In one example, the range-detection sensors 102 are located on each side of the vehicle 105 (e.g., front, rear, left, right) to enable the range-detection sensors 102 in monitoring each portion of the surrounding area of the vehicle 105. Additionally, or alternatively, the range-detection sensors 102 may be positioned at other location(s) of the vehicle 105 that enable the range-detection sensors to monitor the surrounding area (also referred to as an operating area).

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols and/or UWB protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the fob 179).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the selective ultrasonic beamforming AM system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the selective ultrasonic beamforming AM system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

In some aspects, the vehicle 105 may include one or more Door Access Panels (DAPs) 191 disposed on exterior door surface(s) of vehicle door(s) 198, and connected with a DAP controller (not shown in FIG. 1). In some aspects, the user 140 may have the option of entering a vehicle by typing in a personal identification number (PIN) on an exterior interface associated with a vehicle. The user interface may be included as part of a Door Access Panel (DAP) 191, a wireless keypad (included as a part of the mobile device 120), or included as part of another interface. The DAP 191, which may operate and/or communicate with the NWB module 187 or another of the ECUs 117, can include and/or connect with an interface with which a ridehail passenger, user, (or any other user such as the user 140) may input identification credentials and receive information from the system. In one aspect, the interface may be or include a DAP 191 disposed on a vehicle door 198, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the interface may alternatively be one or more other types of interfaces described above.

The NWB module 187, can include sensory and processor functionality and hardware to facilitate user and device authentication, and provide occupant customizations and support that provide customized experiences for vehicle occupants. The NWB module 187 may connect with a Driver Assistance Technologies (DAT) controller 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 199 may provide Level-1 through Level-3 automated driving and driver assistance functionality that can include, for example, active parking assistance, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition. The DAT controller 199 can obtain input information via the sensory system(s) 182, which may include sensors disposed on the vehicle interior and/or exterior (sensors not shown in FIG. 1). In the example depicted in FIG. 1, the vehicle 105 includes a sensor bank disposed on a roof surface of the vehicle 105 enclosed in a sensor tiara 183. It should be appreciated that the transducer array 163 may be located on an exterior vehicle surface as shown in FIG. 1, or may be disposed on another surface, or any number of surfaces of the vehicle's exterior.

In other aspects, the DAT controller 199 may also be configured and/or programmed to control Level-1 through Level-4 driver assistance when the vehicle 105 includes autonomous vehicle driving features. The DAT controller 199 may connect with and/or include the VPS 181, which may include internal and external sensory systems (collectively referred to as sensory systems 182). The sensory systems 182 may be configured and/or programmed to obtain sensor data usable for biometric authentication, and for performing driver assistance operations such as, for example, active parking, trailer backup assistance, adaptive cruise control and lane keeping, driver status monitoring, and/or other features.

The vehicle 105 further contains a transducer array 163 that may be configured to emit ultrasonic waves and AM audio signals to a surrounding area of the vehicle 105. As illustrated in FIG. 1, the transducer array 163 can include a plurality of ultrasonic transducers that may be configured and/or programmed to send directional ultrasonic signals via ultrasonic beamforming with AM audio. In the illustrated example, the transducer array 163 is configured to have a 360-degree range for emitting the directional signals. That is, the transducer array 163 may be configured and/or programmed to emit a directional ultrasonic signal with AM audio in any horizontal direction from the vehicle 105.

In some examples, the transducer array 163 is configured and/or programmed to have a vertical emission range such that the transducer array 163 can lower or raise a direction of the audio signal. Further, in some examples, the vehicle 105 includes a plurality of speaker arrays that are configured and/or programmed to emit a plurality of respective directional audio signals in different directions. For example, the sensory system(s) 182 may be disposed on multiple sides of the vehicle 105.

The computing system architecture of the automotive computer 145, VCU 165, and/or the selective ultrasonic beamforming AM system 107 may omit certain computing modules. It should be readily understood that the computing environment depicted in FIG. 1 is an example of a possible implementation according to the present disclosure, and thus, it should not be considered limiting or exclusive.

In some aspects, the selective ultrasonic beamforming AM system 107 may localize users and non-users in an operating zone (which may be a PEPS zone, for example) of the vehicle 105. In the example embodiment illustrated in FIG. 2, the selective ultrasonic beamforming AM system 107 (the system depicted in FIG. 1) may localize the primary user 140A and define a target zone 153 associated with the primary user 140A, in accordance with the present disclosure. The selective ultrasonic beamforming AM system 107 may localize the primary user 140A during the remote control maneuver, and track the mobile device 120 or fob 179 using standard wireless techniques, which may include received signal strength, time of flight, angle of arrival, and other known methods.

Figure 2:
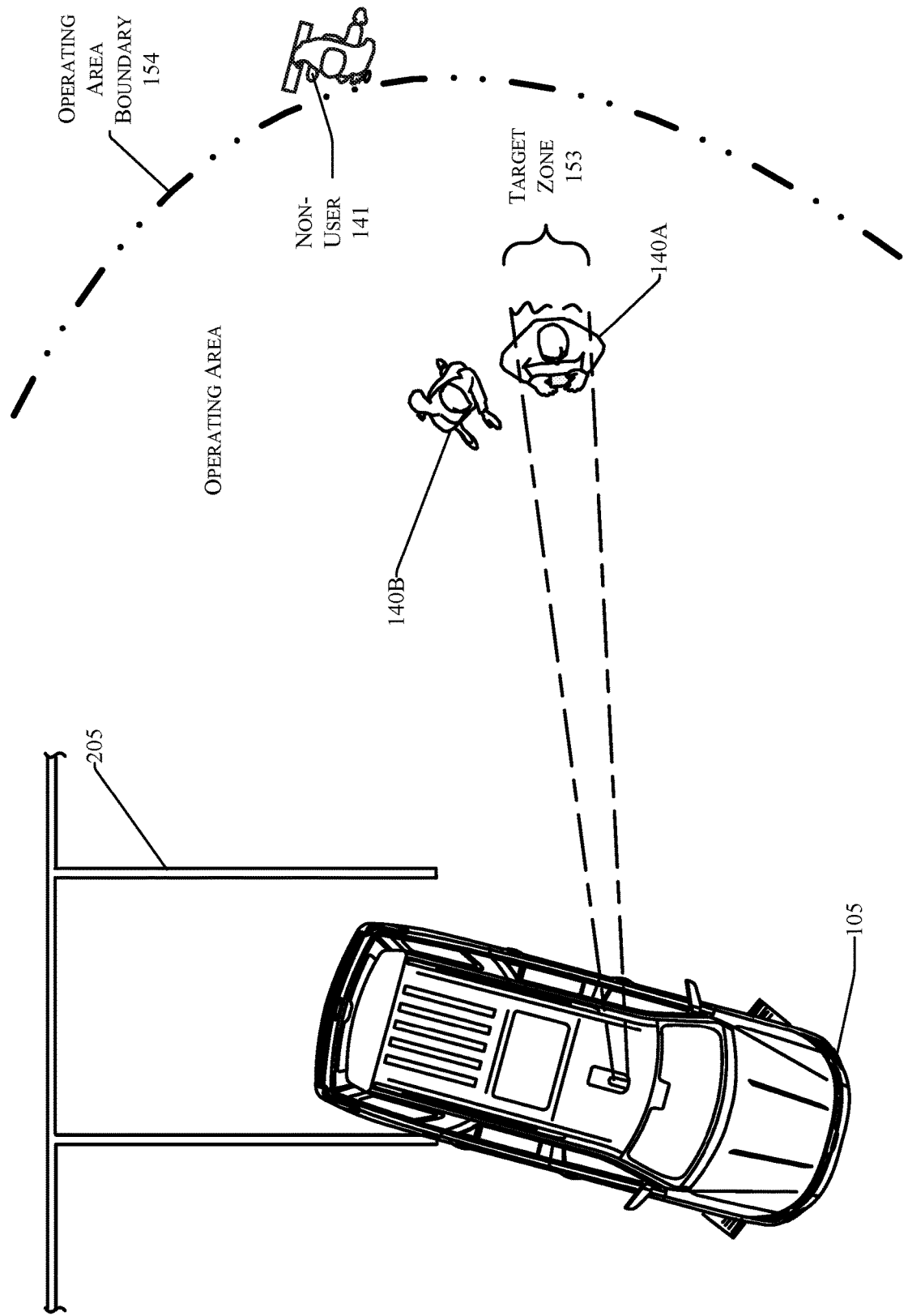
FIG. 2 depicts localizing a primary user and defining a primary user target zone using the selective Ultrasonic beamforming AM system in accordance with the present disclosure.

After identifying and localizing the primary user 140A, the selective ultrasonic beamforming AM system 107 may obtain additional relevant information from the VPS 181, which may include an exterior sensor sensory system (not shown in FIG. 2) to determine whether the secondary user 140B is associated with the primary user 140A, and/or to determine the relationship of others in the operating area, such as the non-user 141 depicted in FIG. 2 as walking into the operating area. The vehicle 105 may localize individuals using the VPS 181, and more particularly, using the external sensory system 881 (described hereafter with respect to FIG. 8), and autonomous driving sensors. One such external sensory system may include LIDAR, cameras, etc. Localizing the primary user 140A (and/or the secondary user 140B) may include determining where the heads of the intended audience of users are located with respect to each other in the operating area, and with respect to the vehicle 105. In other aspects, the VPS 181 may also determine other metrics associated with the trajectory and gaze of the users 140A and 140B, as well as the gaze of the non-user 141, which may be informative to the system 107 to determine whether the primary user 140A and any other detected individuals such as the secondary user 140B may be associated with respect to one another, and thus, be an appropriate recipient for auditory messages delivered from the vehicle.

Figure 3:
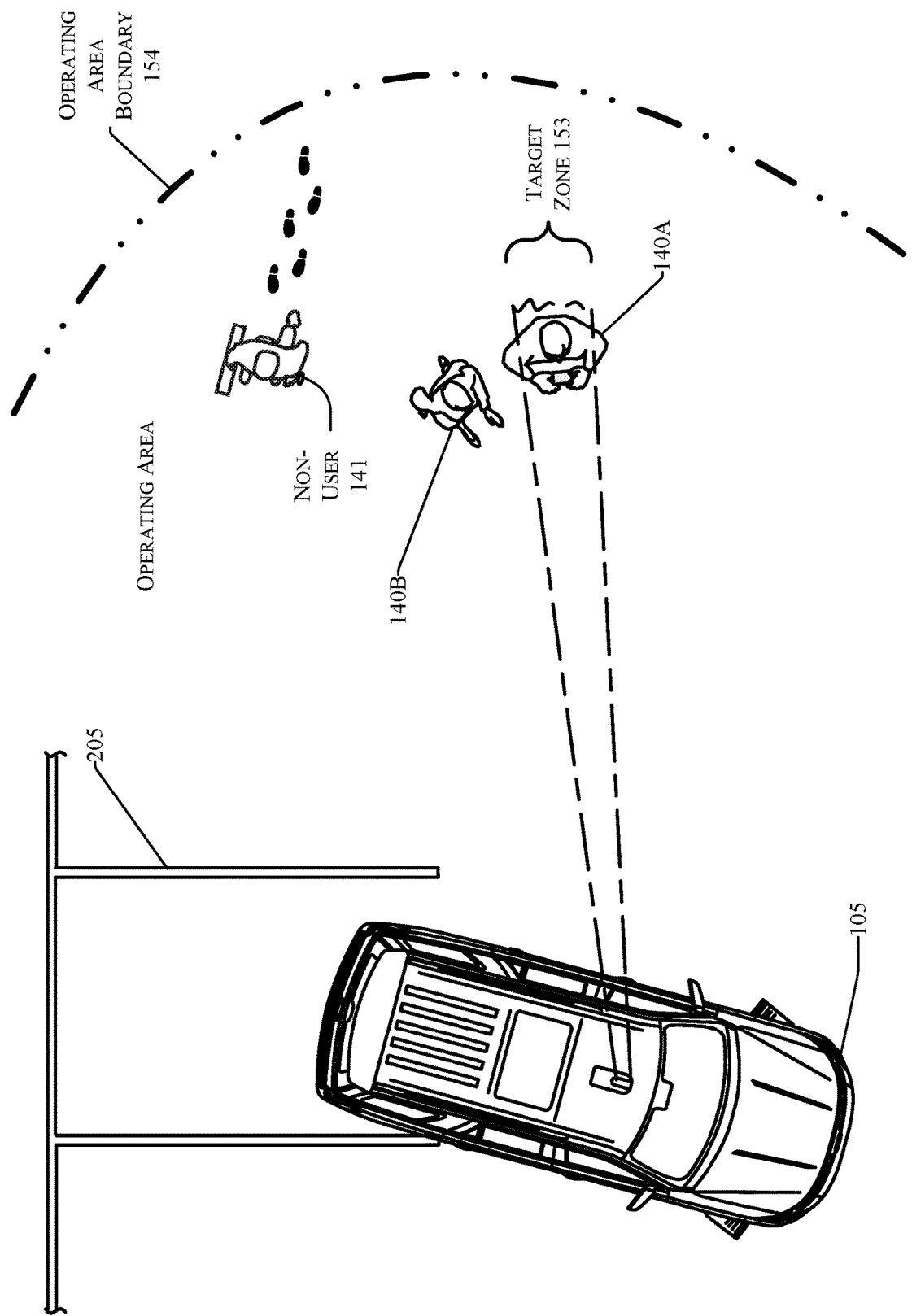
FIG. 3 illustrates localizing a secondary user, and localizing a non-user in accordance with the present disclosure.

FIG. 3 illustrates localizing the secondary user 140B, and localizing the non-user 141, in accordance with the present disclosure. As the vehicle 105 performs the remote operation procedure (e.g., backing into a parking spot) the system 107 may localize the primary user 140A, who may be controlling aspects of the remote vehicle control operation via the mobile device 120. Other unrelated individuals may also be in close proximity to the vehicle, such as the non-user 141 who has walked into the operating area. Accordingly, the VPS 181 may perceive all three individuals, and characterize their association with one another and with the vehicle 105.

Figure 4:
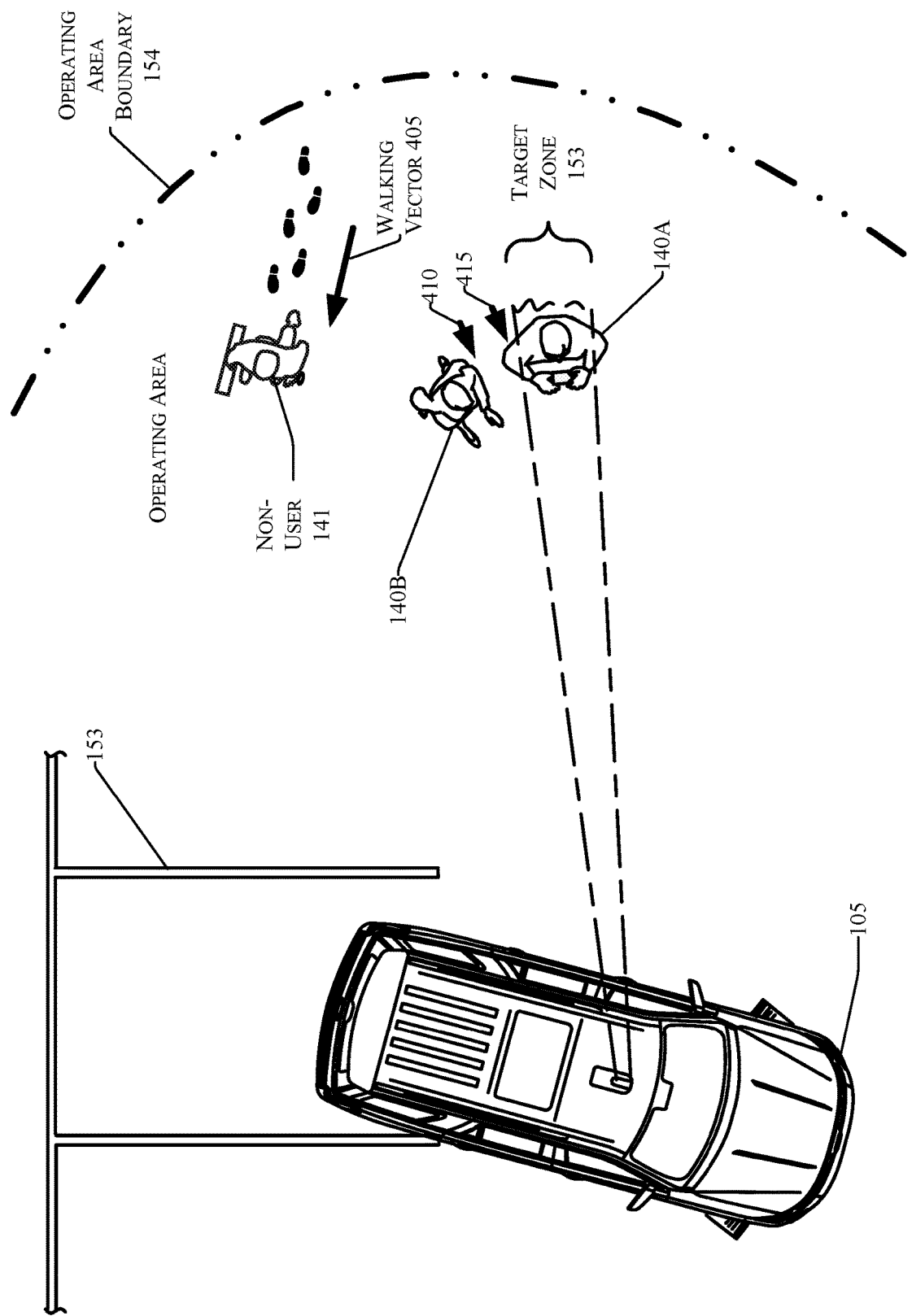
FIG. 4 illustrates characterizing an association between localized parties in accordance with the present disclosure.

In some aspects, it may not always be advantageous to send an audio message to everyone in the operating area. Accordingly, the system 107 may localize the secondary user 140B, and determine that the secondary user 140B is associated with the primary user 140A. The system 107 may perform this procedure by evaluating various data points that can be indicative of a relative relationship between detected parties. In one aspect, the primary user 140A and/or the secondary user 140B may carry a fob 179 (as shown in FIG. 1). Responsive to identifying one or more signal(s) from the fob(s) 179, the system 107 may determine that the secondary user 140B, who is proximate to the primary user 140A, are associated. The system 107 may further include information received from a biometric identification and control module (not shown in FIGS. 1-3) providing facial recognition, gait recognition, and other indicia of personal identification that may be used to form an association between the proximate, primary user 140A and the secondary user 140B. In another example, the primary user 140A and the secondary user 140B are depicted in FIG. 2 as standing approximately two steps within one another, and are generally facing each other, the same direction, and/or facing the vehicle 105, which may indicate, in part, that there exists a probability of mutual association. In another aspect, the primary user 140A and the secondary user 140B may be slowly walking together, as depicted in FIG. 4, which may be further indicia of mutual association. In other aspects, individuals may be identified according to biometric data points such as gait or walking style, pace, thermographic video feeds, and/or other known methods for identifying and characterizing individuals.

FIG. 4 illustrates another example for characterizing an association between localized parties, in accordance with the present disclosure. As shown in FIG. 4, the non-user 141 is depicted walking in a direction and at a pace represented by a walking vector 405. The primary user 140A and the secondary user 140B may also be pacing in tandem, represented as walking vectors 410 and 415 (representing a walking pace and direction for the secondary user 140B and the primary user 140A, respectively). The walking vectors 410 and 415 share a generally similar pace and direction, whereas the non-user 141 is clearly walking in an unrelated path and at a much faster pace than the primary and secondary users 140A, 140B. Since the primary user (140A) and the secondary user 140B are walking in a comparably slower rhythm as compared to the walking vector 405, the system 107 may conclude that the non-user 141 is unrelated to the vehicle 105 and/or the users 140A, 140B.

Figure 5:
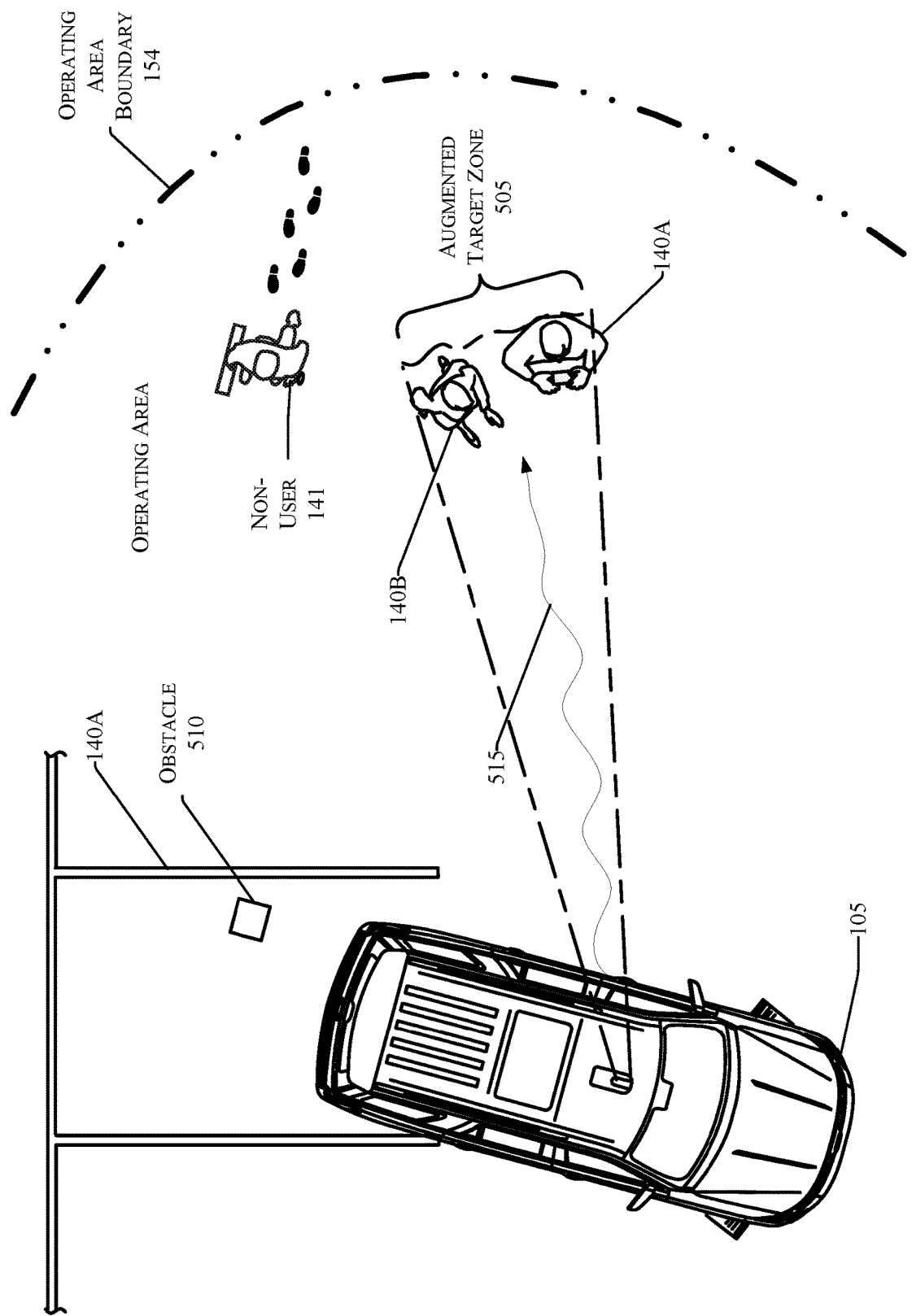
FIG. 5 illustrates defining an augmented target zone and transmitting an ultrasonic AM audio signal to the primary and secondary users in accordance with the present disclosure.

FIG. 5 illustrates defining an augmented target zone 505 and transmitting an ultrasonic beamformed audio signal to the primary and secondary users within the zone in accordance with the present disclosure. Now that the system 107 has determined, within a predetermined threshold for mutual association, that the primary user 140A and the secondary user 140B are likely the only individuals in the operating area to whom the system 107 should share an audio message, the system 107 may re-define the target zone 153 as shown in FIG. 1 to include not just the head of the primary user (as shown in FIG. 4), but also include the secondary user's head in a augmented target zone 505 (as shown in FIG. 5). Moreover, the system 107 may exclude any person exterior to the augmented target zone 505, such as the non-user 141.

There are many possible reasons for communication of a message or alert to the primary and secondary users 140A, 140B. In one example scenario, if the vehicle 105 is performing the remote parking assist maneuver, and the VPS 181 determines that an obstacle 510 is present in the vehicle path, an alert message could be sent. Specifically, a plastic bag may have blown into the vehicle pathway, and the DAT controller 199 (as shown in FIG. 1) may not have determined independently that the detected obstacle 510 is benign. In one aspect, the vehicle 105 may deliver auditory information to the primary user 140A and the secondary user 140B via an ultrasonic beamformed audio signal 515 that includes an alert to pause the maneuver/stop the vehicle to investigate the obstacle, and indicate whether the vehicle 105 may subsequently continue motive operations in view of the detected obstacle, or if the vehicle 105 should stop the maneuver to allow the user(s) 140 to remove the object from the vehicle's path. With the augmented target zone 505 defined to include only the heads of the primary and secondary users 140A and 140B, respectively, the non-user 141 may continue on his way peacefully and undisturbed, as the vehicle 105 provides the audible alert only to the users 140. The non-user 141 is not in the path of the ultrasonic beam and therefore cannot hear the audio signal 515 alert because he or she is outside of the augmented target zone 505.

Figure 6:
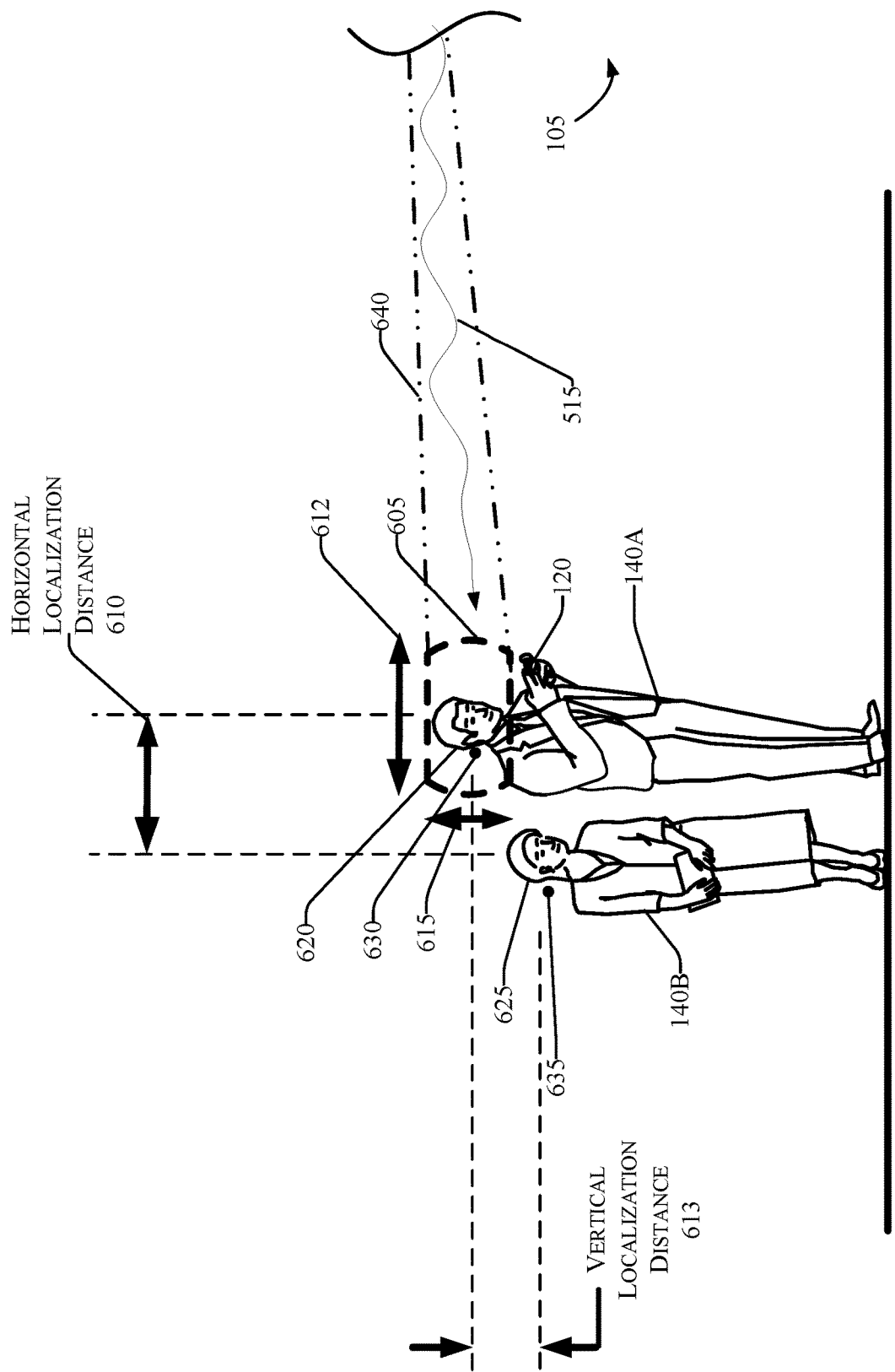
FIG. 6 depicts another view of localization of the primary and secondary users, and defining a primary target zone in accordance with the present disclosure.

FIG. 6 depicts another view of localization for the primary and secondary users 140A and 140B, and illustrates defining a primary target zone 605 associated with the primary user 140A, in accordance with the present disclosure. As depicted in FIG. 6, the primary user 140A may perform some aspect of vehicle motive control using the mobile device 120. The primary target zone 605 may be substantially similar or identical to the target zone 153 depicted in FIGS. 1, and 3-4, but shown from a ¾ front-view perspective. For example, the primary target zone 605 may be defined as having a horizontal dimension 612 and a vertical dimension 615, where the system 107 defines the respective dimensions based on a localized position of the primary user's head 620.

It should be appreciated that the horizontal dimension 612 is defined with the horizontal width to include only the primary user's point of hearing (the audio signal target 630). By limiting the size of the target zone 605, other people in the operating area will not perceive any audible sounds. In one aspect, the system 107 may localize the audio signal target 630 on either side of the primary user's head 620, corresponding to predicted position(s) of the user's ears.

In another aspect, the system 107 may localize a position of the second user's head 625 with respect to the first user's head 620. For example, the system 107 may define a horizontal localization distance 610 that defines an approximate minimum width, with which the system 107 may determine a horizontal dimension for an augmented target zone. In another aspect, the system 107 may determine a vertical localization dimension 613 with which the system 107 may define an augmented target zone vertical dimension 615.

Figure 7:
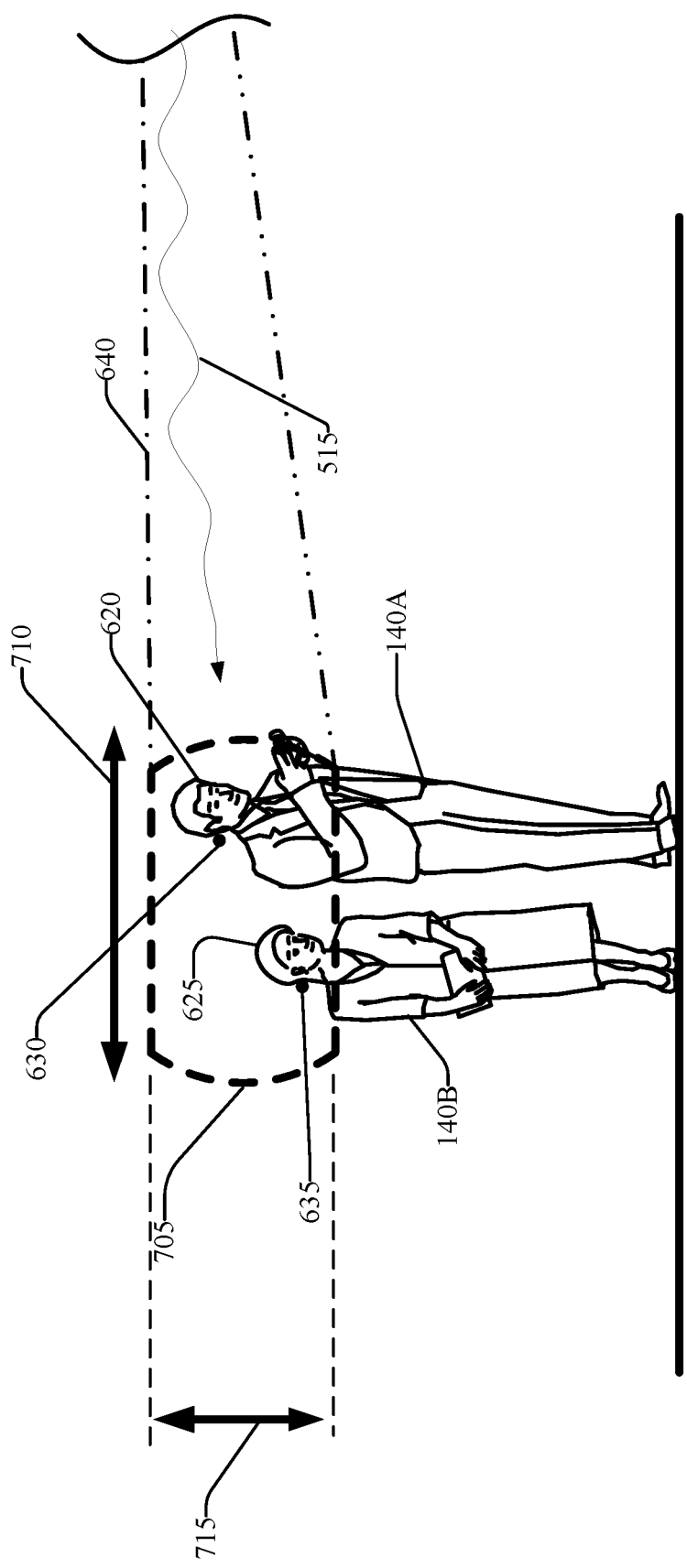
FIG. 7 illustrates a relative localization of the secondary user, and defining an augmented target zone in accordance with the present disclosure.

FIG. 7 illustrates relative localization of the secondary user, and defining an augmented target zone in accordance with the present disclosure. Using the horizontal localization distance 610 and the vertical localization distance 613 (as shown in FIG. 6), the system 107 may determine an augmented horizontal target zone dimension 710 and an augmented vertical target zone dimension 715, which may define a limiting boundary for the augmented target zone 705. As shown in FIG. 7, only the audio signal targets 630 and 635 will be points at which the ultrasonic beam is directed and the audio signal 515 delivered may be perceived, because the beamforming device 159 (as shown in FIG. 1) has limited the audible portion of the ultrasonic beam and audio signal to include only those listening points, and excluded all other areas from audible sound.

Figure 8:
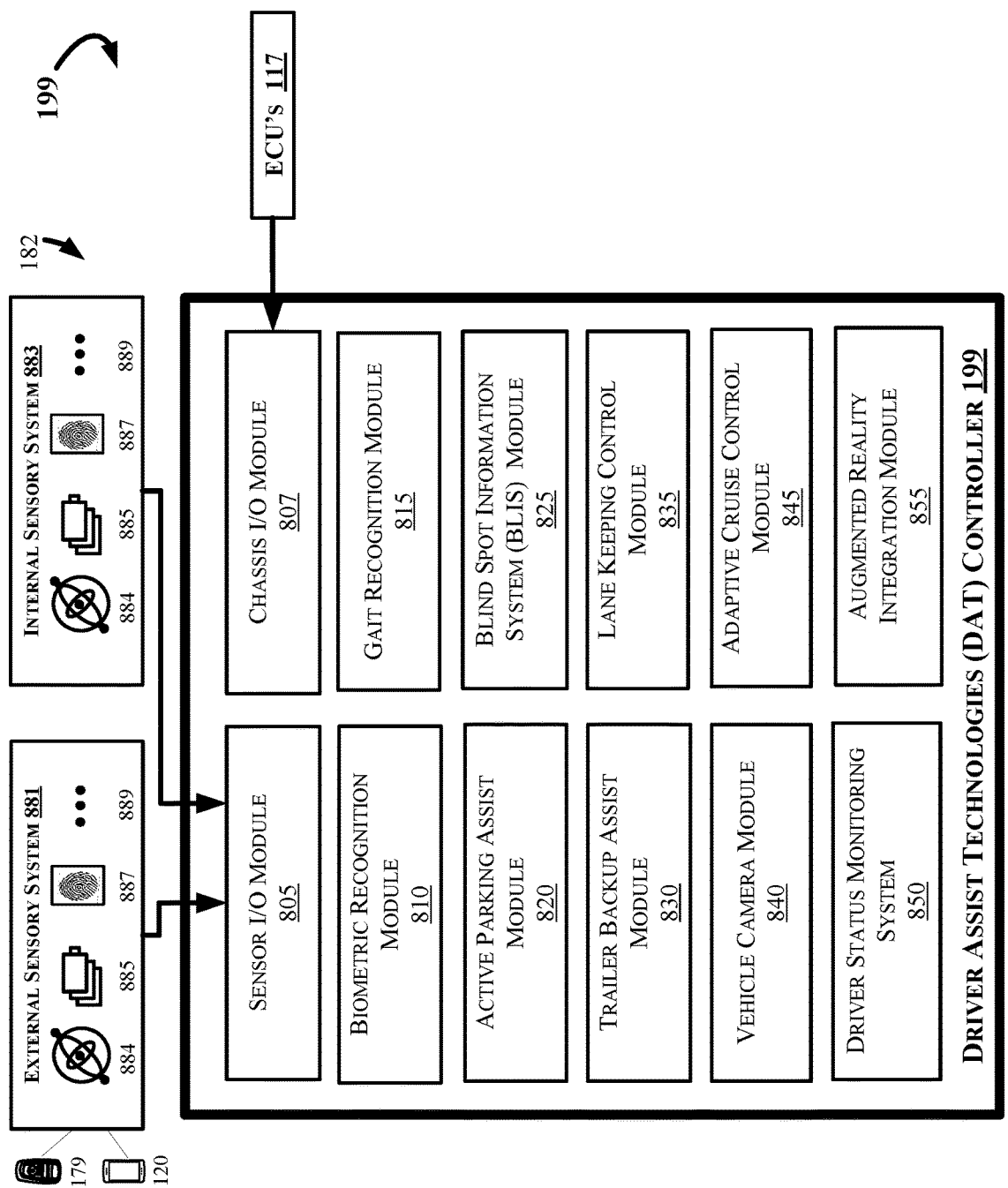
FIG. 8 depicts a functional schematic of a Driver Assist Technologies (DAT) controller in accordance with the present disclosure.

FIG. 8 depicts an example DAT controller 199, in accordance with an embodiment. As explained in prior figures, the DAT controller 199 may provide automated driving and driver assistance functionality, and may provide aspects of user and environmental assistance. The DAT controller 199 may facilitate user authentication, such as biometric authentication that can include face recognition fingerprint recognition, voice recognition, gait recognition, and other unique and non-unique biometric aspects such as user and head localization. The DAT controller 199 may further provide vehicle monitoring, and multimedia integration with driving assistance.

In one example embodiment, the DAT controller 199 may include a sensor I/O module 805, a chassis I/O module 807, a chassis I/O module 807, a Biometric Recognition Module (BRM) 810, a gait recognition module 815, an active parking assist module 820, a blind spot information system (BLIS) module 825, a trailer backup assist module 830, a lane keeping control module 835, a vehicle camera module 840, an adaptive cruise control module 845, a driver status monitoring system 850, and an augmented reality integration module 855, among other systems. It should be appreciated that the functional schematic depicted in FIG. 8 is provided as an overview of functional capabilities for the DAT controller 199, and should not be construed as limiting. In some embodiments, the vehicle 105 may include more or fewer modules and control systems.

The DAT controller 199 can obtain input information via the sensory system(s) 182, which may include the external sensory system 881 and the internal sensory system 883 sensors disposed on the vehicle 105 interior and/or exterior, and via the chassis I/O module 807, which may be in communication with the ECUs 117. The DAT controller 199 may receive the sensor information associated with driver functions, and environmental inputs, and other information from the sensory system(s) 182.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include the VPS 181, which may include internal and external sensory systems (collectively referred to as sensory systems 182). The sensory systems 182 may be configured and/or programmed to obtain sensor data usable for biometric authentication, and for performing driver assistance operations such as, for example, active parking, trailer backup assistance, adaptive cruise control and lane keeping, driver status monitoring, and/or other features.

The DAT controller 199 may be configured and/or programmed to provide biometric authentication control for the vehicle 105, including, for example, facial recognition, fingerprint recognition, voice recognition, and/or provide other authenticating information associated with characterization, identification, occupant appearance, occupant status, and/or verification for other human factors such as gait recognition, body heat signatures, eye tracking, etc. The DAT controller 199 may obtain the sensor information from an external sensory system (not shown in FIG. 8), which may include sensors disposed on the vehicle exterior, and in devices connectable with the vehicle 105 such as the mobile device 120 and/or the fob 179.

The DAT controller 199 may further connect with the sensory system 182, which can include an internal sensory system 883, which may include any number of sensors configured in the vehicle interior (e.g., the vehicle cabin, which is not depicted in FIG. 8). The external sensory system 881 and the internal sensory system 883 can connect with and/or include one or more inertial measurement units (IMUs) 884, camera sensor(s) 885, fingerprint sensor(s) 887, and/or other sensor(s) 889, and obtain biometric data usable for characterization of the sensor information for identification of biometric markers stored in a secure biometric data vault (not shown in FIG. 8) onboard the vehicle 105, and to obtain environmental data for providing driver assistance features.

The camera sensor(s) 885 may include thermal cameras, optical cameras, near infrared cameras, and/or a hybrid camera having optical, thermal, or other sensing capabilities. Thermal cameras may provide thermal information of objects within a frame of view of the camera(s), including, for example, a heat map figure of a subject in the camera frame. An optical camera may provide a color and/or black-and-white image data of the target(s) within the camera frame. The camera sensor(s) 885 may further include static imaging, or provide a series of sampled data (e.g., a camera feed) to the biometric recognition module 810.

The IMU(s) 884 may include a gyroscope, an accelerometer, a magnetometer, or other inertial measurement device. The fingerprint sensor(s) 887 can include any number of sensor devices configured and/or programmed to obtain fingerprint information. The fingerprint sensor(s) 887 and/or the IMU(s) 884 may also be integrated with and/or communicate with a passive key device, such as, for example, the mobile device 120 and/or the fob 179. The fingerprint sensor(s) 887 and/or the IMU(s) 884 may also (or alternatively) be disposed on a vehicle exterior space such as the engine compartment or door panel (not shown in FIG. 8), etc. In other aspects, when included with the internal sensory system 883, the IMU(s) 884 may be integrated in one or more modules disposed within the vehicle cabin or on another vehicle interior surface.

Figure 9:
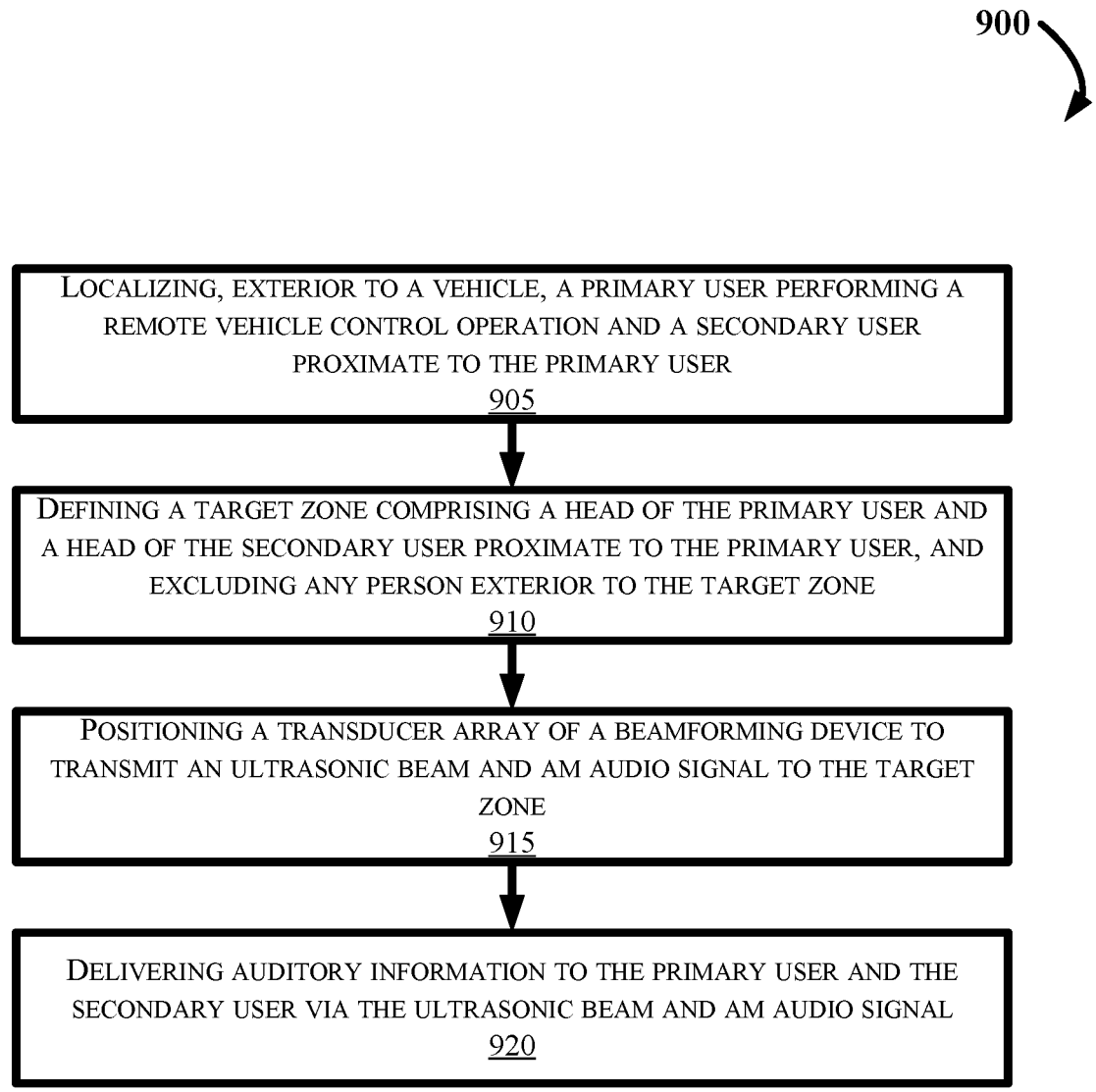
FIG. 9 depicts a flow diagram of an example method for selective ultrasonic beamforming AM communication in accordance with the present disclosure.

FIG. 9 is a flow diagram of an example method 900 for elective ultrasonic beamforming amplitude modulated (AM) communication, according to the present disclosure. FIG. 9 may be described with continued reference to prior figures, including FIGS. 1-8. The following process is exemplary and not confined to the steps described hereafter. Moreover, alternative embodiments may include more or less steps, that are shown or described herein, and may include these steps in a different order than the order described in the following example embodiments.

Referring first to FIG. 9, at step 905, the method 900 may commence with localizing, exterior to a vehicle, a primary user performing a remote vehicle control operation, and a secondary user proximate to the primary user.

At step 910, the method 900 may further include defining a target zone comprising a head of the primary user and a head of the secondary user proximate to the primary user, and excluding any person exterior to the target zone.

At step 915, the method 900 may further include steering a transducer array of a beamforming device to transmit an ultrasonic audio signal to the target zone.

At step 920, the method 900 may further include delivering auditory information to the primary user and the secondary user via the ultrasonic audio signal.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In summary, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for selective ultrasonic beamforming amplitude modulated (AM) communication, comprising:
localizing, exterior to a vehicle, a primary user performing a remote vehicle control operation, and a secondary user proximate to the primary user;
determining that the secondary user is associated with the primary user;
localizing the secondary user with respect to the primary user responsive to determining that the secondary user is associated with the primary user;
defining, based on the determination that the secondary user is associated with the primary user, a target zone comprising a head of the primary user and a head of the secondary user proximate to the primary user, and excluding any person exterior to the target zone;
steering a transducer array of an ultrasonic beamforming device to transmit an AM audio signal to the target zone; and
delivering auditory information to the primary user and the secondary user via the AM audio signal on an ultrasonic carrier.

2. The method according to claim 1, further comprising: defining the target zone by changing a shape of the ultrasonic carrier based on a position of the secondary user.

3. The method according to claim 1, wherein steering the transducer array of the ultrasonic beamforming device comprises changing one or more of a vertical position and a horizontal position of an output of the transducer array or increasing or decreasing a width of the target zone.

4. The method according to claim 2, wherein changing the shape of the ultrasonic carrier comprises increasing or decreasing a height of the target zone.

5. The method according to claim 1, wherein the auditory information comprises a feedback message associated with the remote vehicle control operation.

6. The method according to claim 1, wherein steering the transducer array comprises a mechanical aiming operation comprising:
altering a horizontal position and a vertical position of the ultrasonic beamforming device via an articulating member disposed on a vehicle exterior surface.

7. The method of claim 1, wherein determining that the secondary user is associated with the primary user is based on a first walking vector of the primary user and a second walking vector of the secondary user.

8. A system, comprising:
an ultrasonic beamforming amplitude modulated (AM) device associated with a vehicle;
a processor in communication with the ultrasonic beamforming AM device; and
a memory for storing executable instructions, the processor programmed to execute the instructions to:
localize, using a sensor of the vehicle and a mobile device of a primary user and exterior to a vehicle, the primary user performing a remote vehicle control operation and a secondary user proximate to the primary user;
define, based on localizing the mobile device of the primary user, a target zone comprising the primary user and the secondary user proximate to the primary user, and excluding any person exterior to the target zone;
steer a transducer array of a beamforming device to transmit an ultrasonic carrier with an AM audio signal to the target zone; and
deliver auditory information to the primary user and the secondary user via the ultrasonic carrier and the AM audio signal.

9. The system according to claim 8, wherein the processor is further programmed to: localize the secondary user exterior to the vehicle;
determine that the secondary user is associated with the primary user;
localize the secondary user with respect to the primary user responsive to determine that the secondary user is associated with the primary user; and
define the target zone responsive to determining that the secondary user is associated with the primary user.

10. The system according to claim 9, wherein the auditory information comprises a feedback message associated with the remote vehicle control operation.

11. The system according to claim 9, wherein the processor is further programmed to mechanically steer the beamforming device by executing the instructions to:

alter a horizontal position and a vertical position of the beamforming device via an articulating member disposed on a vehicle exterior surface.

12. The system according to claim 9, wherein the processor is further programmed to: define the target zone by changing a shape of the ultrasonic carrier based on a position of the secondary user.

13. The system according to claim 12, wherein the processor is further programmed to steer the ultrasonic carrier and AM audio signal electronically.

14. The system according to claim 13, wherein the processor is further programmed to alter the shape of the ultrasonic carrier by executing the instructions to:
increase or decreasing a width of the target zone.

15. The system according to claim 13, wherein the processor is further programmed to alter the shape of the ultrasonic carrier by executing the instructions to:
increase or decrease a height of the target zone.

16. The system according to claim 13, wherein the processor is further programmed to position the transducer array of the beamforming device by executing the instructions to:
actuate a vertically and horizontally articulated transducer array aiming mechanism; and
position the transducer array by changing one or more of a vertical position and a horizontal position of the transducer array.

17. A non-transitory computer-readable storage medium in a beamforming device controller, the computer-readable storage medium having instructions stored thereupon which, when executed by a processor, cause the processor to:
localize, using a sensor of a vehicle and a mobile device of a primary user and exterior to a vehicle, a primary user performing a remote vehicle control operation and a secondary user proximate to the primary user;
define, based on localizing the mobile device of the primary user, a target zone comprising the primary user and the secondary user proximate to the primary user, and excluding any person exterior to the target zone;
position a transducer array of a beamforming device to transmit an ultrasonic beam and AM audio signal to the target zone; and
deliver auditory information to the primary user and the secondary user via the AM audio signal and ultrasonic beam.

18. The non-transitory computer-readable storage medium according to claim 17, having further instructions stored thereupon to:
localize the secondary user exterior to the vehicle;
determine that the secondary user is associated with the primary user;
localize the secondary user with respect to the primary user responsive to determining that the secondary user is associated with the primary user; and
define the target zone, responsive to determining that the secondary user is associated with the primary user, by changing a shape of the ultrasonic beam based on a position of the secondary user.

19. The non-transitory computer-readable storage medium according to claim 17, having further instructions stored thereupon to:
define the target zone by changing a shape of the ultrasonic beam based on a position of the secondary user.

* * * * *